United States Patent
Zhao et al.

(10) Patent No.: US 11,573,146 B2
(45) Date of Patent: Feb. 7, 2023

(54) ULTRASONIC METHOD AND DEVICE FOR INDIRECTLY MEASURING CAVITY PRESSURE OF INJECTION MOLDING MACHINE

(71) Applicant: Zhejiang University, Hangzhou (CN)

(72) Inventors: Peng Zhao, Hangzhou (CN); Jianfeng Zhang, Hangzhou (CN); Yao Zhao, Hangzhou (CN); Fu Gu, Hangzhou (CN); Junye Huang, Hangzhou (CN); Neng Xia, Hangzhou (CN); Jianzhong Fu, Hangzhou (IN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/256,524

(22) PCT Filed: Sep. 19, 2019

(86) PCT No.: PCT/CN2019/106683
§ 371 (c)(1),
(2) Date: Dec. 28, 2020

(87) PCT Pub. No.: WO2020/057601
PCT Pub. Date: Mar. 26, 2020

(65) Prior Publication Data
US 2021/0247256 A1    Aug. 12, 2021

(30) Foreign Application Priority Data
Sep. 21, 2018   (CN) .......................... 201811104574.8

(51) Int. Cl.
*G01L 11/06*     (2006.01)
*B29C 45/00*     (2006.01)
*B29C 45/77*     (2006.01)

(52) U.S. Cl.
CPC .......... *G01L 11/06* (2013.01); *B29C 45/0082* (2013.01); *B29C 45/77* (2013.01)

(58) Field of Classification Search
CPC ..... B29C 45/0082; B29C 45/77; B29C 45/76; B29C 2945/76474; G01B 17/00; G01L 11/06; G01L 11/04
(Continued)

(56) References Cited

U.S. PATENT DOCUMENTS

| 5,161,594 | A | * | 11/1992 | Bolton | ................. | B22D 17/26 |
| | | | | | | 164/151.2 |
| 5,183,605 | A | * | 2/1993 | Brown | ................. | B29C 35/0277 |
| | | | | | | 425/149 |
| 2001/0051858 | A1 | | 12/2001 | Liang | | |
| 2017/0282423 | A1 | * | 10/2017 | Murata | ................. | B29C 45/80 |

FOREIGN PATENT DOCUMENTS

| CN | 101799455 A | * | 3/2010 | ............. G01N 29/36 |
| CN | 102601951 A | | 7/2012 | |

(Continued)

OTHER PUBLICATIONS (Huang et al., "A novel clamping force searching method based on sensing tie-bar elongation for injection molding", 2017, International Journal of Heat and Mass Transfer, vol. 109, pp. 223-230).*
(Continued)

*Primary Examiner* — Matthew J Daniels
*Assistant Examiner* — Gregory C. Grosso
(74) *Attorney, Agent, or Firm* — Getech Law LLC; Jun Ye

(57) ABSTRACT

The present invention discloses a ultrasonic method for indirectly measuring a pressure of a cavity of an injection molding machine, comprising: emitting ultrasonic wave to each pull rod along an axial direction of the pull rod respectively at the same time, detecting an ultrasonic wave echo time difference of each pull rod, and obtaining an
(Continued)

average pressure inside a cavity of the injection molding machine. By the detection method and detection device of the present invention, the pressure inside the cavity may be detected in a certain state, the pressure inside the cavity in the injection molding process may be detected in real time, and the detection process is simple and the accuracy is high.

4 Claims, 2 Drawing Sheets

(58) Field of Classification Search
USPC .................................................. 264/40.1
See application file for complete search history.

(56) References Cited

FOREIGN PATENT DOCUMENTS

| CN | 102935711 A | 2/2013 |
|----|-------------|--------|
| CN | 103499642 A | 1/2014 |
| CN | 203418735 U | 2/2014 |
| CN | 105674925 A | 6/2016 |
| CN | 105904646 A | 8/2016 |
| CN | 107727284 A | 2/2018 |
| CN | 207408026 A | 5/2018 |
| CN | 109470400 A | 3/2019 |

OTHER PUBLICATIONS (Huang et al., "A novel clamping force searching method based on sensing tie-bar elongation for injection molding", 2017, International Journal of Heat and Mass Transfer, vol. 109, pp. 223-230). (Year: 2017).*

Official Action (1) dated Jul. 24, 2019, CN Application No. 201811104574.8, No English Translation, 6 pages.

Official Action (2) dated Dec. 5, 2019, CN Application No. 201811104574.8, No English Translation, 3 pages.

International Search Report dated Dec. 20, 2019, PCT/CN2019/106683, Both Chinese and English Parts, 13 Pages.

Written Opinion dated Dec. 20, 2019, PCT/CN2019/106683, No English Translation, 5 Pages.

* cited by examiner

ULTRASONIC METHOD AND DEVICE FOR INDIRECTLY MEASURING CAVITY PRESSURE OF INJECTION MOLDING MACHINE

CROSS-REFERENCE TO RELATED APPLICATIONS

This application claims the benefit of and priority to International Patent Application No. PCT/CN2019/106683 filed Sep. 19, 2019, and Chinese Patent Application No. 201811104574.8 filed on Sep. 21, 2018, the entire contents of which are incorporated herein by reference.

TECHNICAL FIELD

The present invention belongs to the technical field of ultrasonic testing and material molding, and particularly relates to an ultrasonic method for indirectly measuring the pressure of a cavity in an injection molding process.

BACKGROUND

Injection molding is the most widely used method for producing plastic products. Polymer melt is injected into the mold cavity in the injection molding process which is very short and with drastic temperature and pressure changes. Different cavity pressures will directly affect the quality of the final product, so the pressure curve of the mold cavity is regarded as the fingerprint of the molding process, which may be used to represent and diagnose the molding process and may also be used to further guide the optimization of the injection molding process. Therefore, for the molding process, the measurement of the cavity pressure curve is very important and is key to realize the intelligent injection molding. The current measurement method for the internal cavity pressure of the mold is mainly through the cavity pressure sensor, by which the pressure change of the melt in the mold cavity can be measured accurately in real time. However, this method has some defects. Firstly, the obtained cavity pressure is only of a certain point. In addition, the sensor is mounted on the surface of the mold cavity, which will damage the mold and leave defects on the surface of the injection molding product. Moreover, the high price of the sensor blocks its popularization in every mold, which brings certain resistance to the on-line detection of the injection molding process.

Previously, related researchers put forward a soft measurement method for the cavity pressure; however, although the method is a nondestructive method, it involves many parameters such as melt density, temperature, and screw rod pressure in the molding process. The specific implementation is complicated and lacks physical connection and theoretical support among the parameters, which will inevitably lose part of the accuracy.

SUMMARY

An objective of the present invention is to provide a method and device for conducting ultrasonic nondestructive detection on cavity pressure in the injection molding process. The force on a pull rod of an injection molding machine is measured with the ultrasonic method, so that the pressure change inside the mold cavity is indirectly measured.

A ultrasonic method for indirectly measuring a pressure of a cavity of an injection molding machine includes: emitting ultrasonic wave to each pull rod respectively along its axial direction at the same time, detecting a time difference between an ultrasonic wave echo of each pull rod and an ultrasonic echo when the pull rod is free, and obtaining an average pressure P inside the cavity of the injection molding machine according to the following formula:

$$P = \pi R^2 \cdot W \cdot \Delta t_{total} / A$$

wherein R is the section radius of the pull rod; $\Delta t_{total}$ is the sum of echo time differences of all the pull rods; W is a constant related to the material of the pull rod; and A is the projection area of the cavity on a plane perpendicular to the axial direction of the pull rod.

A ultrasonic method for measuring the total force of pull rods of the injection molding machine includes: emitting ultrasonic wave to each pull rod respectively along its axial direction at the same time, detecting a time difference between an ultrasonic wave echo of each pull rod and an ultrasonic echo when the pull rod is free, and obtaining the total pulling force $F_{rod}$ of the pull rod of the injection molding machine according to the following formula:

$$F_{rod} = \pi R^2 \cdot W \cdot \Delta t_{total}$$

wherein R is the section radius of the pull rod; $\Delta t_{total}$ is the sum of echo time differences of all the pull rods; and W is a constant related to the material of the pull rod.

A ultrasonic method for measuring the force of a pull rod of the injection molding machine includes: emitting ultrasonic wave to each pull rod respectively along its axial direction at the same time, detecting a time difference between an ultrasonic wave echo of each pull rod and an ultrasonic echo when the pull rod is free, and obtaining the pulling force F of any pull rod of the injection molding machine according to the following formula:

$$F = \pi R^2 \cdot W \cdot \Delta t$$

wherein R is a section radius of the pull rod; $\Delta t$ is an echo time difference of the pull rod; and W is a constant related to the material of the pull rod.

The present invention may be applied to real-time detection on the cavity pressure of the injection molding machine on line, and may also be applied to detect the cavity pressure of the injection molding machine in a certain state. Preferably, the ultrasonic wave is emitted to each pull rod continuously in the injection molding process, and the average pressure inside the cavity of the injection molding machine in the injection molding process is displayed in real time. By adoption of the technical solution, the cavity pressure can be detected in the injection molding process on line.

As an option, before detection, for the pull rod with the same material, detection is conducted by a mold locking force sensor under different mold locking forces to acquire multiple groups of σ–Δtdata, a straight line passing through an origin is fitted and the slope of the straight line is evaluated to obtain the W, wherein the σ is a stress on the pull rod, as a y-coordinate, and the Δt is a time difference of an ultrasonic wave echo, as an x-coordinate. The stress σ on the pull rod can be directly detected by the mold locking force sensor; and the time difference Δt of the ultrasonic wave echos may be acquired by an ultrasonic acquisition unit.

Preferably, there are four pull rods.

Preferably, an ultrasonic probe is arranged at one end of each pull rod.

Preferably, a curve of time and average cavity pressure of the injection molding machine is output in real time.

Preferably, a recording frequency of an ultrasonic wave echo signal is higher than or equal to 20 Hz.

A device for indirectly measuring the cavity pressure of an injection molding machine ultrasonically includes:

An ultrasonic probe mounted at one end of the pull rod, the ultrasonic probe being axially mounted for the pull rod;

An ultrasonic acquisition unit for controlling the ultrasonic signal and receiving the ultrasonic echo;

A calculation and output unit for processing the acquired ultrasonic echo signals and outputting an average cavity pressure of the injection molding machine, the calculation and output unit obtaining the average cavity pressure P of the injection molding machine by the following formula:

$$P = \pi R^2 \cdot W \cdot \Delta t_{total} \Big/ A$$

wherein R is a section radius of the pull rod; $\Delta t_{total}$ is the sum of echo time differences of all the pull rods; W is a constant related to the material of the pull rods; and A is a projection area of the cavity on a plane perpendicular to the axial direction of the pull rod.

Preferably, there are four pull rods; the ultrasonic acquisition unit has four ultrasonic acquisition channels; and the calculation and output unit is a computer.

Preferably, the ultrasonic acquisition unit is an ultrasonic acquisition card; and the computer is connected to a display for displaying the average cavity pressure of the injection molding machine in real time.

The present invention utilizes the change of the echo waveform of the ultrasonic signals to realize the on-line measurement of the pressure in the molding process and is applied to monitoring and diagnosis of the process, based on the acoustic elasticity theory of the material and through analysis of the ultrasonic signal.

The ultrasonic wave is a common nondestructive detection method, which can directly detect numerous physical quantities, including the deformation of the material. In the injection molding process, the pressure of the melt on the mold cavity is transmitted to a movable mold plate of the injection molding machine, then is transmitted to the pull rod of the injection molding machine and finally is reflected on the force deformation of the pull rod. According to the ultrasonic method to measure extension of the pull rods of the injection molding machine in the present invention, the pressure of the melt in the cavity in the injection molding process is represented. The method has many advantages of stability, no destructiveness, on line, low cost and the like.

Injection molding is an intermittent and circulating batch process. Before the injection process starts, the mold is closed, and an oil cylinder of the injection molding machine gives a certain mold locking force to the mold at this time. The mold locking force is transmitted to the pull rod of the injection molding machine through a fixed mold and a movable mold of the injection molding machine due to the counter-acting force and then the pull rod of the injection molding machine is subjected a certain pulling force at this time. The pulling force may be measured by the ultrasonic detection method. Similarly, after the injection process starts, the high-temperature and high-pressure polymer melt is injected into the cavity of the mold, a front mold and a rear mold of the mold are subjected to an extrusion force from the melt at this time, and the extrusion force, similar to the mold locking force, is finally transmitted to the pull rod of the injection molding machine. According to the method, the force on the pull rod is obtained by analyzing the displacement of the ultrasonic wave echo of the pull rod of the injection molding machine and based on the principle of acoustic elastic effect, and the force is converted into the pressure inside the mold cavity according to the physical force model. Obviously, if the ultrasonic signals are continuously acquired and analyzed in a certain period of time (generally one cycle of the injection molding process), the change curve of the pressure inside the mold cavity in the molding process may be obtained. The obtained curve is further analyzed, may be used to represent various information in the injection process and can provide basis for further process optimization.

Different from other existing research methods, the present invention does not select the measuring point in the injection mold and originally proposes to realize indirection representation of the pressure of the mold cavity by detecting the force on the pull rod of the injection molding machine. According to the method, damage to the mold by measurement and the processing cost are avoided; and since the measuring device is mounted on a machine frame of the injection molding machine, it may be adapted to almost all molds and is favorable for the popularization of the method.

By the detection method and detection device of the present invention, the pressure inside the cavity may be detected in a certain state, the pressure inside the cavity in the injection molding process may be detected in real time, and the detection process is simple and the accuracy is high.

DETAILED DESCRIPTION OF EMBODIMENTS

Figure 1:
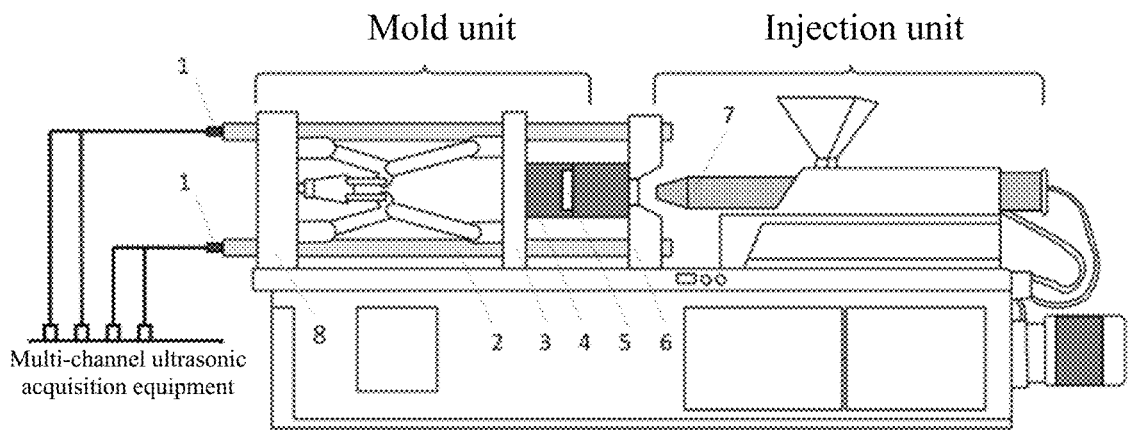
FIG. 1 is a schematic diagram of a measuring device.

The measuring method according to the present invention may be applied to detection on a cavity pressure of an injection molding machine for producing plastic products. The injection molding machine mainly includes an injection unit and a mold unit, wherein the injection unit is mainly an injection charging barrel 7, and a polymer is melted and plasticized by a screw rod in the injection charging barrel and is injected into a cavity 5 in a mold. The mold unit includes a fixed mold plate 6, a movable mold plate 3, a mold 4 and other key parts. Before injection starts, the injection molding machine provides a certain power to push the movable mold plate to close front and rear parts of the mold, the cavity is formed between the movable mold plate and the fixed mold plate, and then the injection process of the molten polymer is conducted.

In the injection process, since the movable mold plate of the injection molding machine is subjected to a thrust, which means that another part, namely a rear mold plate 8, of the injection molding machine will be subjected to an opposite reaction thrust which finally acts on a pull rod 2 of the injection molding machine (the rear mold plate 8 is fixed to one end of the pull rod and is placed on a guide rail of a machine frame; and the other end of the pull rod and the fixed mold plate 6 are mutually fixed and the fixed mold plate 6 is fixed to the machine frame simultaneously).

To measure the force change of the pull rod in the measuring molding process, the device is provided with an ultrasonic probe 1 at the tail end of the pull rod and ensures that the ultrasonic probe 1 is arranged over against an axial direction of the pull rod and can emit ultrasonic wave along the axial direction of the pull rod. Generally, one injection molding machine has four pull rods which are distributed at four symmetrical corners of the machine. For the accuracy of measurement, preferably, four ultrasonic probes are mounted at the tail ends, away from the fixed mold plate, of the four pull rods respectively during specific measurement.

The specific installation and coupling mode of the ultrasonic probe may adopt a common ultrasonic coupling agent, such as glycerinum and the like, which serves as a coupling medium and is smeared between a surface of the probe and a measured object. Moreover, the ultrasonic probe is fixed and pressed by a certain mechanical method. In addition, the probe may be directly stuck on the surface of the measured object with glue which may realize fixation and may also serve as a coupling agent.

The other side of the ultrasonic probe is connected to a multi-channel ultrasonic acquisition equipment (namely an ultrasonic acquisition unit). The equipment should have multi-channel adjusting, controlling, displaying and continuously recording functions on the ultrasonic signals and can continuously acquire the ultrasonic signals in a certain period of time. Preferably, the continuous acquisition frequency should be higher than 20 Hz. Preferably, the equipment should have four ultrasonic acquisition channels so as to meet real-time and synchronous signal acquisition at the positions of the four pull rods. The ultrasonic acquisition equipment may select the existing four-channel ultrasonic acquisition card.

The principle of the measuring method is that through analysis on the ultrasonic wave echo (or ultrasonic echo) echoes received at different time have different time shift, and the force situation of the material may be calculated according to the acoustic elasticity theory of the material and according to the displacement of the echo (or the time difference to receive ultrasonic wave echoes).

When t=0s, the ultrasonic wave emitted from the ultrasonic probe is propagated in the pull rod of the injection molding machine along the axial direction and at a certain speed and is reflected at the other end of the pull rod, and finally the ultrasonic wave echo is received by the same probe at t=$t_1$. When the pull rod is subjected to the mold locking force of the injection molding machine, the pull rod extends due to the force. Based on the acoustic elasticity theory, the propagation speed $C_\sigma$ of the ultrasonic wave in a connecting rod changes, as shown in the formula 1. In this case, the echo is received by the probe at t=$t_\sigma$, meeting:

$$\rho_0 \cdot C_\sigma^2 = \lambda + 2\mu + \frac{\sigma}{3\lambda + 2\mu}\left[2l + \lambda + \frac{(\lambda+\mu)(4m+4\lambda+10\mu)}{\mu}\right];$$

obtaining after conversion:

$$C_\sigma = \sqrt{\frac{\lambda + 2\mu + \frac{\sigma}{3\lambda + 2\mu}\left[2l + \lambda + \frac{(\lambda+\mu)(4m+4\lambda+10\mu)}{\mu}\right]}{\rho_0}} \quad (1)$$

wherein $\rho_0$, $\sigma$ and $C_\sigma$ are respectively the density of the pull rod, the stress of the pull rod and the propagation speed of the ultrasonic wave under the stress. l, m and n are Murnaghan constants, and $\lambda$ and $\mu$ are Lame constants of the material. Obviously, assuming $\sigma=0$, the formula (1) is changed into:

$$\rho_0 \cdot C_0^2 = \lambda + 2\mu;$$

obtaining after conversion:

$$C_0 = \sqrt{\frac{\lambda + 2\mu}{\rho_0}} \quad (2)$$

Therefore, the initial speed of the ultrasonic wave may be obtained through an equation (2). It may be known by substituting the constant and calculating $$\frac{dC_\sigma}{d\sigma}$$

that $\sigma$ is within an experimental range (that is, a range of the stress applied to the pull rod during the experiment), the numerical value of $$\frac{dC_\sigma}{d\sigma}$$

is approximately unchanged, and the formula (1) may be simplified into a linear function $$C_\sigma = \frac{1}{\sqrt{\rho_0}}\left(C_0 - \frac{dC_\sigma}{d\sigma}|_{\sigma=0} \cdot \sigma\right) \quad (3)$$

wherein $$\frac{dC_\sigma}{d\sigma}\bigg|_{\sigma=0} = \frac{2l + \lambda + (\lambda+\mu)(4m+4\lambda+10\mu)/\mu}{2(3\lambda + 2\mu)\sqrt{\lambda + 2\mu}},$$

further, through combination of the formula (2) and the formula (3), there is:

$$(C_0 - C_\sigma)/C_0 = K \cdot \sigma \quad (4)$$

wherein K=[2lμ+λμ+(λ+μ)(4m+4λ+10μ)]/[2μ(3λ+2μ)(λ+2μ)] Is an acoustic elastic coefficient of the material and is an intrinsic material parameter, representing the acoustic elasticity of the pull rod.

On the other hand, $C_0$ and $C_\sigma$ in the formula (4) have the following relationship:

$$C_0 = 2l_0/t_0 \quad (5)$$

$$C_\sigma = 2l_0(1+\sigma/E)/t_\sigma \quad (6)$$

wherein $t_0$ is the propagation time of the ultrasonic wave when the pull rod is not subjected to a stress. Similar to $t_0$, $t_\sigma$ represents the propagation time then the pull rod is under a stress. E is the elasticity modulus of the pull rod. When there is no pressure, the natural length of the pull rod is $l_0$, the relative time change $(t_\sigma - t_0)/t_0$ is set, and the following formula may be obtained through the formulas (4)-(6):

$$(t_\sigma - t_0)/t_0 = \frac{\sigma/E + K\sigma}{1 - K\sigma} \quad (7)$$

Since $K_\sigma \ll 1$, the formula may be simplified as:

$$\sigma = \frac{1}{K_1 \cdot t_0} \cdot (t_\sigma - t_0) \quad (8)$$

Wherein $$K_1 = \left(\frac{1}{E} + K\right)$$

is the attribute constant of the material.

The stress on the pull rod may be calculated through the formula (8), but the coefficient K is very complex and the five material constants l, m, n, λ and μ are difficult to obtain. Therefore, preferably, we try to avoid direct calculation of the coefficient K and define:

$$ks = \frac{1}{t_0\left(\frac{1}{E} + K\right)} \quad (9)$$

The formula (9) may be simplified as:

$$\sigma = ks \cdot \Delta t \quad (10)$$

Then, with the help of a mold locking force tester, the coefficient ks (namely constant W=ks) may be obtained according to data measured under different mold locking forces. If Δt between the stress σ on the pull rod and the ultrasonic wave echo is measured by the mold locking force sensor under a series of mold locking forces, a scatter diagram is drawn by the data to fit a zero cross point straight line, and the slope of the straight line is the coefficient ks. After the ks is obtained, a mold locking force and cavity pressure curve may be measured by an ultrasonic method.

After the force on the pull rod is obtained, it is necessary to convert the force on the pull rod into a pressure in the mold cavity through a certain physical model. As shown in FIG. 1, firstly, before the injection stage starts, the injection molding machine provides a mold locking force to the mold. The mold locking force is applied to the pull rods of the injection molding machine and the injection molding mold, so strain is generated on the pull rods. At the beginning of the injection stage, a plastic melt will apply a force F to a cavity of the mold at a certain moment. When the F increases, the force F will gradually counteract the initial mold locking force, and then will increase along with the mold locking force on the pull rod and reach to a peak value. At this time, on one hand, the formula (12) may be obtained by calculating the force $F_{rod}$ on the pull rod:

$$F_{rod} = \pi R^2 \cdot \sigma_{total} \quad (11)$$

and according to the formula (10), $$\sigma_{total} = ks \cdot \Delta t_{total} \quad (12)$$

Wherein $\sigma_{total}$ is a total strain of the four pull rods and is measured and calculated jointly by four ultrasonic probes mounted at the tail ends of the pull rods, and R is a section radius of the pull rod; $\Delta t_{total}$ is the sum of time differences between the ultrasonic wave echo when all the pull rods and the ultrasonic echo when the pull rods are free, that is, the sum of the time differences of the echoes on the four pull rods for one group of ultrasonic waves which are emitted simultaneously at a certain time; and ks is a coefficient obtained in the previous step. On the other hand, an average pressure inside the mold cavity is represented by P. Due to a relationship between an acting force and a counter-acting force, $F_{rod}$ is equal to the acting force $F_{cavity}$ on the mold by the melt in the cavity, and a calculation formula of the average pressure P inside the cavity is shown in the formula (13):

$$P = F_{cavity}/A \quad (13)$$

wherein A is the projection area of the cavity on a plane perpendicular to the axial direction of the pull rod.

During actual detection, the four ultrasonic probes are mounted at the tail ends of the four pull rods of the injection molding machine respectively. According to the mounting method, the ultrasonic probes may be pressed at the tail ends of the pull rods of the injection molding machine through adhesion with glue or a coupling agent for ultrasonic detection and by virtue of a certain external force (such as a magnetometer base). One end of a signal line is connected to the ultrasonic probe and the other end of the signal line is connected to the ultrasonic acquisition card. A power supply is turned on and the displayed waveform is adjusted until the echo signal can be observed and continuously recorded.

A mold is mounted on the injection molding machine, an injection molding raw material which is dried in advance is added into an injection molding hopper, a plasticizing temperature of an injection molding screw rod is set, a motor of the injection molding machine is turned on after the temperature reaches to a set value, proper parameters of processes such as injection pressure-retaining cooling and the like are set, and the injection molding process is prepared to start after injection molding circulation for several times and after the system is stabilized. An acquisition and recording command of the ultrasonic wave is started firstly, then mold closing of the injection molding machine, injection, pressure retaining, cooling, storage, mold opening and ejection are conducted, ultrasonic wave acquisition is stopped, the recorded echo signals within a period of time are stored locally for the convenience of further analysis and processing subsequently, and the next production and measurement circulation is conducted. Finally, the acquired echo signal data is processed to obtain a time difference (or an ultrasonic time shift Δt) between each ultrasonic echo and a reference echo (the first echo), the force on the corresponding pull rod at each time measuring point is calculated by combining with the acoustic elasticity theory, and further integration and calculation are conducted to finally obtain an average pressure-time curve of the melt in the mold cavity.

In the whole process, process parameters, such as injection pressure, pressure-retaining pressure, mold locking force and the like, in the production process may be adjusted. This will affect the performance quality of the final product and will also be reflected in the process pressure curve obtained through ultrasonic measurement.

Specific Example

In this example, a direct glue feeding method is adopted, and a mold core with a cavity structure being a 1 mm-thick sheet is mounted.

Figure 2A:
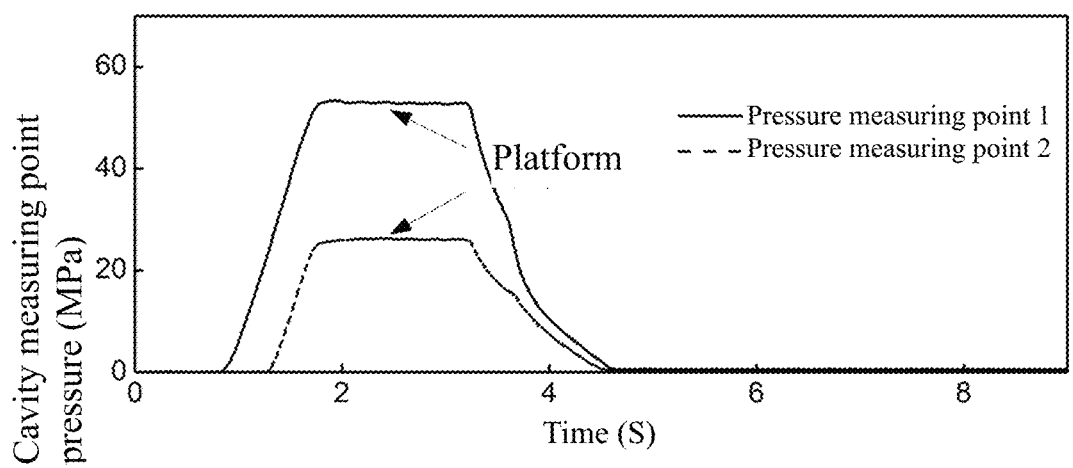
FIG. 2a and FIG. 2b are respectively a pressure curve of a melt at a measuring point in a cavity in a certain injection molding process and a pull rod force change curve measured by an ultrasonic probe on a certain pull rod.
Figure 2B:
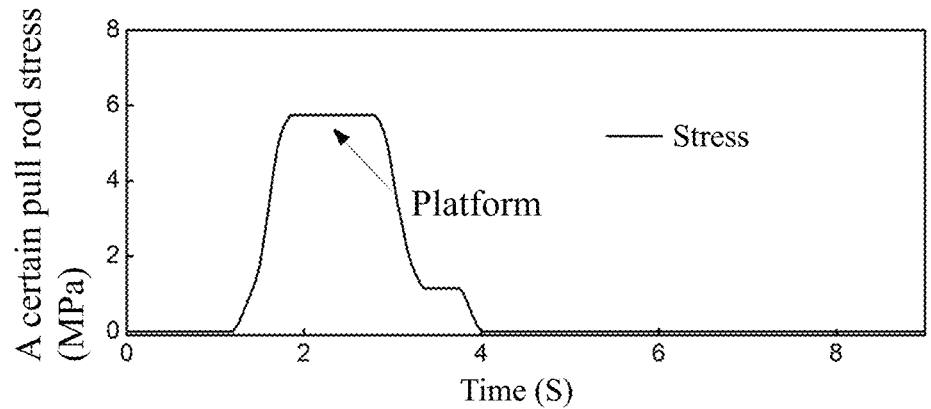

To intuitively reflect the rationality of the measuring method, FIG. 2a shows a pressure curve of a melt at a measuring point in a cavity in a certain injection molding process detected by an existing sensor, and FIG. 2b shows a pull rod force change curve measured by an ultrasonic probe on a certain pull rod according to the present invention. It can be seen that the force change on the pull rod coincides with the mold cavity pressure change measured by the mold cavity pressure sensor well, which also indicates that the method for measuring the force of the pull rod ultrasonically may be used for measuring the pressure change of the mold cavity in the injection process.

A sampling frequency of the ultrasonic acquisition card in the experiment is 100 MHz, the minimum time interval $\Delta t$ is 10 ns, that is, a time resolution is 10 ns, the resolution is about 1.25 MPa when being converted to the force on the pull rod. When the force on the pull rod is small, a jagged contour will occur in the curve, and the measurement precision may be improved by increasing the sampling frequency of the equipment. Preferably, it is suggested that the sampling frequency of the equipment should not be less than 500 MHz.

Figure 3:
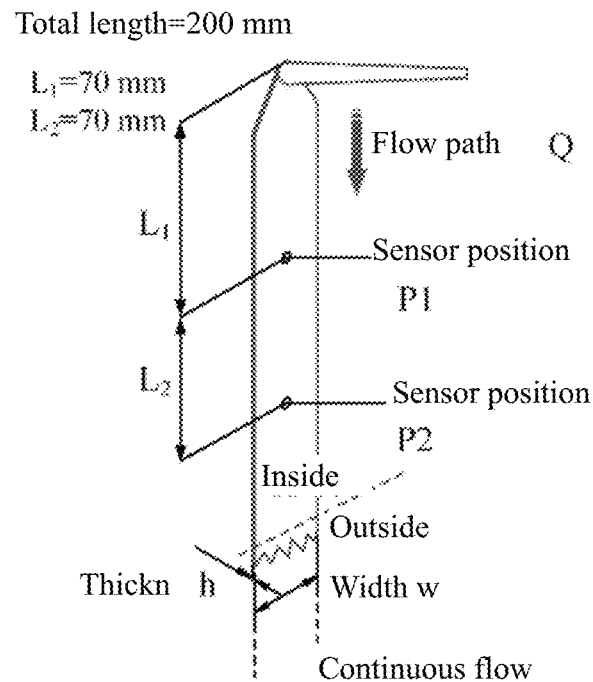
FIG. 3 is a structural schematic diagram of a cavity in a mold used in a specific embodiment.

Obviously, if the force on the pull rod is converted into the force in the mold cavity, $F_{cavity}$ and $F_{rod}$ should be the same. To verify the accuracy of the measuring method and the theoretical model, a sheet-like cavity model with a length of 200 mm, a width of 30 mm and a thickness of 1 mm is selected as an experiment mold for verifying the model. The mounting position of the mold cavity pressure sensor used in the experiment and the shape of the mold cavity are shown in FIG. 3.

According to the knowledge of fluid mechanics, the average pressure inside the mold cavity may be simplified as:

$$P = \frac{P_1 - P_2}{70} * 40 + P_2$$

two group of data under different injection molding parameters are selected to verify the model. The two groups of data are acquired respectively through the injection molding processes of different materials LDPE and PP. The calculation result is shown in table 1.

through comparison between the numerical values of the mold cavity pressure and the force on the pull rod in the two groups of data of the measurement results of the LDPE and the PP, it is proved that the average pressure in the mold cavity may be measured by measuring the force of the pull rod.

Figure 4:
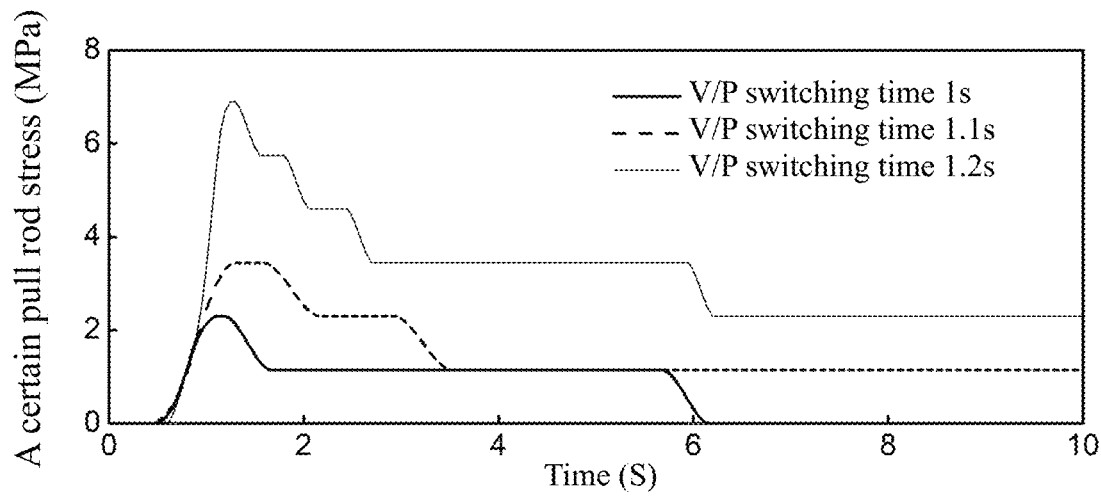
FIG. 4 is a schematic diagram of different curve shapes corresponding to different V/P switching points in the injection process.

Further, the proposed method may present the change of the mold cavity pressure in the injection molding process under a proper mold locking force, so that on-line measurement of the injection molding process is implemented; the performance of the injection product can be predicted at a certain degree with similar methods used by the mold cavity pressure sensor; meanwhile, the cost of the method is relatively low. FIG. 4 shows different curve shapes corresponding to different V/P switching points (pressure-retaining switching points) in the injection process.

Obviously, the curve change caused by the V/P switching time may be applied into detection of too early V/P switching in the on-line process. In the same way, the method may also be applied to on-line detection and diagnosis of various parameters, such as pressure-retaining time, pressure-retaining pressure, injection speed and the like which affects the quality of the final product.

The invention claimed is:

1. An ultrasonic method for indirectly measuring a pressure of a cavity of an injection molding machine, comprising:

emitting ultrasonic wave to each pull rod along an axial direction of the pull rod respectively at the same time, detecting a time difference between an ultrasonic wave echo on each pull rod in an injection molding process and an ultrasonic wave echo when the pull rod is under minimal strain, and obtaining an average pressure P inside the cavity of the injection molding machine according to the following formula:

$$P = \pi R^2 \cdot W \cdot \Delta t_{total} / A$$

wherein R is the section radius of the pull rod; $\Delta t_{total}$ is the sum of echo time differences of all the pull rods; W is a constant at least partially determined based on one or more Murnaghan constants and one or more Lamé constants of the material of the pull rod; and A is the projection area of the cavity on a plane perpendicular to the axial direction of the pull rod;

wherein there are four pull rods; wherein an ultrasonic probe is arranged at the tail end of each pull rod;

wherein the W is acquired by the following method: before detection, for the pull rod with the same material, conducting detection by a mold locking force

TABLE 1

| | Mold cavity pressure sensor | | | | Pull rod end ultrasonic sensor | | | |
|---|---|---|---|---|---|---|---|---|
| Material | Cavity pressure P1 (bar) | Cavity pressure P2 (bar) | Average pressure (bar) | Force on mold cavity (N) | Ultrasonic time shift Δt (10 ns) | | Pull rod force (MPa) | Force on pull rod (N) |
| LDPE | 549.52 | 274.13 | 431.49 | 246779.77 | 32.00 | 60.00 | 108.56 | 257782.51 |
| PP | 558.81 | 276.92 | 438.00 | 250502.54 | 28.00 | 64.00 | 108.17 | 256866.58 |

The experiment result in Table 1 shows that the relative error of the measured force on the mold cavity and the measured force on the pull rod is less than 5%. Therefore, sensor under different mold locking forces to acquire multiple groups of σ–Δt data, and fitting a straight line passing through the origin of σ–Δt data, and evaluating the slope of the straight line to acquire the W, where the σ is a stress on the pull rod as a y-coordinate and the Δt is a time difference of ultrasonic wave echoes, as an x-coordinate.

2. The ultrasonic method for indirectly measuring a pressure of a cavity of an injection molding machine according to claim 1, wherein the ultrasonic wave is emitted to each pull rod continuously in the injection molding process, and the average pressure in the cavity of the injection molding machine in the injection molding process is displayed in real time.

3. The ultrasonic method for indirectly measuring a pressure of a cavity of an injection molding machine according to claim 1, wherein a curve of time and average pressure inside the cavity of the injection molding machine is output in real time.

4. The ultrasonic method for indirectly measuring a pressure of a cavity of an injection molding machine according to claim 1, wherein a recording frequency of an ultrasonic wave echo signal is higher than or equal to 20 Hz.

\* \* \* \* \*